Figure 6:
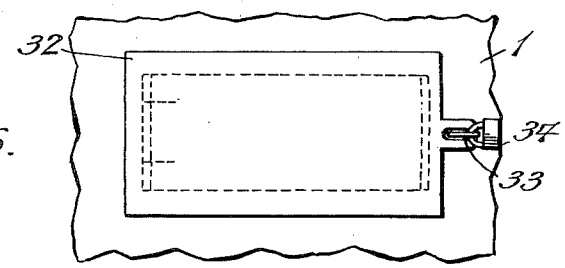

T. DOUGLAS.
SPEED GOVERNOR.
APPLICATION FILED MAY 4, 1912.
1,078,336.
Patented Nov. 11, 1913.
2 SHEETS—SHEET 1.
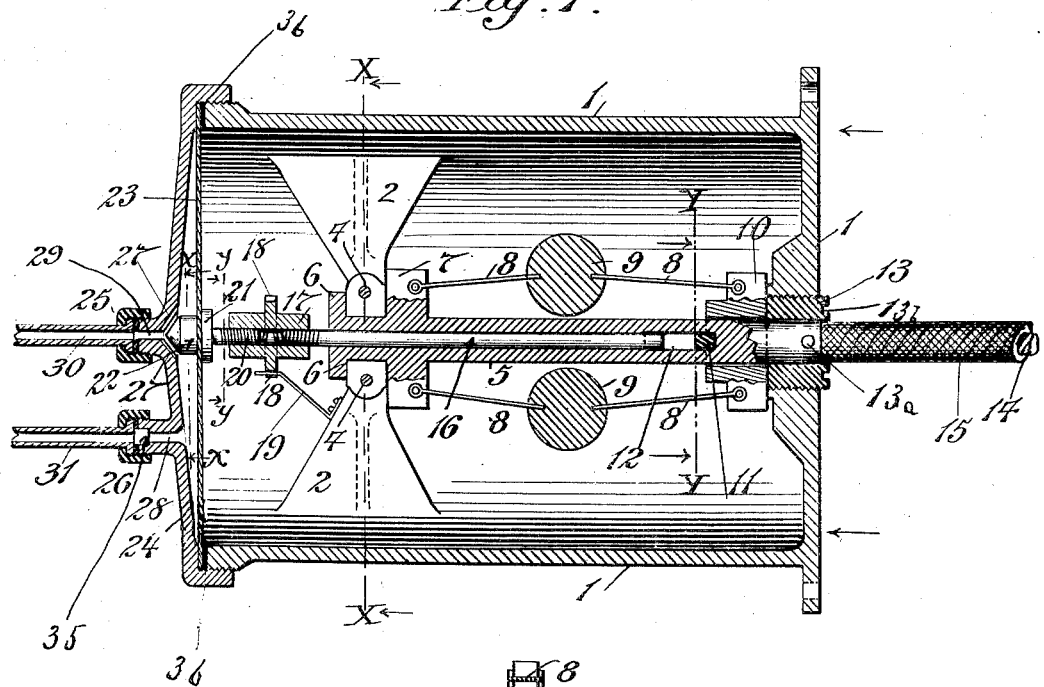
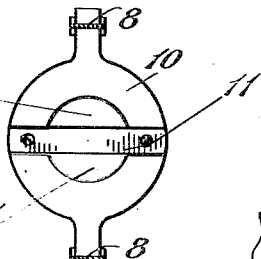
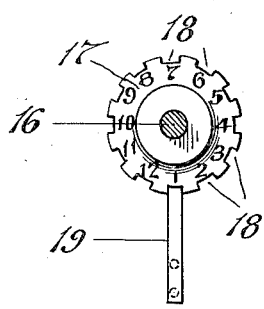
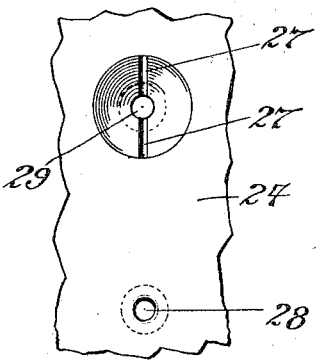
Witnesses:
Edward Rowland
M. F. Keating
Inventor
Theodore Douglas
By Attorney
Charles J. Kinter

T. DOUGLAS.
SPEED GOVERNOR.
APPLICATION FILED MAY 4, 1912.

1,078,336.

Patented Nov. 11, 1913.

2 SHEETS—SHEET 2.

Witnesses:
Edward Rowland
M. F. Keating

Inventor
Theodore Douglas
By Attorney
Charles J. Kintner

UNITED STATES PATENT OFFICE.

THEODORE DOUGLAS, OF SCARBORO, NEW YORK.

SPEED-GOVERNOR.

1,078,336.   Specification of Letters Patent.   Patented Nov. 11, 1913.

Application filed May 4, 1912. Serial No. 695,296.

*To all whom it may concern:*

Be it known that I, THEODORE DOUGLAS, a citizen of the United States, and resident of Scarboro, county of Westchester, and State of New York, have made a new and useful Invention in Speed-Governors, of which the following is a specification.

The present invention relates to speed controllers, and particularly to speed controllers for self-propelled vehicles.

More particularly, the invention is designed for use with motors operated by a gas or fluid, and it has for its object to provide simple mechanism whereby should the vehicle attain a speed exceeding a predetermined maximum speed, the supply of gas or fluid to the engine will be reduced and thus cause a diminishing of the speed of the vehicle by the slowing down of the motor.

Another object of the invention is to so construct the means for controlling the fluid or fuel supply that it shall be certain in operation, and in which the resistance to control will be automatically and progressively increased, with the increase of the speed of the vehicle beyond a predetermined maximum speed.

A further object of the invention is to provide a fluid or fuel supply control, which shall be entirely inclosed and protected, so that the gases or other fluids shall not escape and foul adjacent parts, and also to prevent any unauthorized adjustment of the fluid or fuel supply control, and further, to provide an inclosing casing for the operating and controlling mechanism of the fluid or fuel supply control, so that when once adjusted such adjustment cannot be changed.

With these objects in view, the present invention consists of a motor, a valve for controlling the supply of fluid or fuel to the motor, an inclosing chamber for such valve, a movable wall for said valve chamber, by means of which the valve is operated, and connections between the movable wall of the valve chamber and a moving part of the vehicle, whereby when the maximum predetermined speed of the vehicle is exceeded, said movable wall will be operated to close the valve, and thus shut off the fluid or fuel supply.

The invention further consists of a valve chamber having a movable wall, a valve operated by said movable wall, means normally disconnected for connecting the said movable wall with a moving part of the vehicle, and a governor driven from the moving vehicle arranged to connect the actuating mechanism and the movable wall, when the predetermined maximum speed of the vehicle is exceeded, whereby to move said wall and actuate the valve for diminishing the fluid or fuel supply to the motor.

The invention further consists of the devices and combinations of devices which will be hereinafter described and named.

The present invention is shown in the accompanying drawings, in which—

Figure 5:
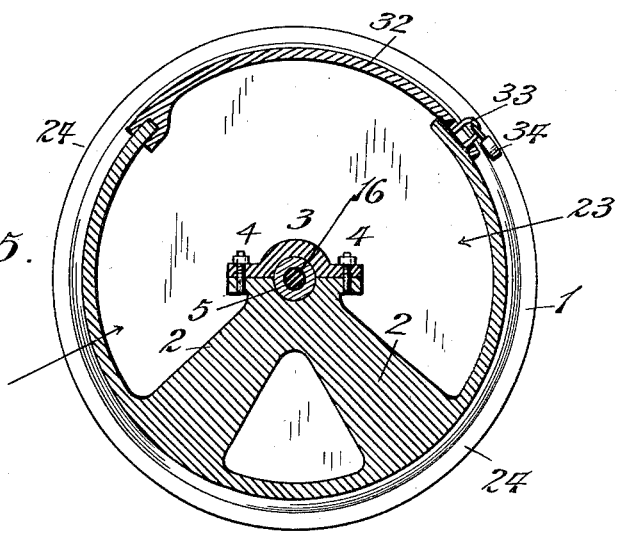
Figure 7:
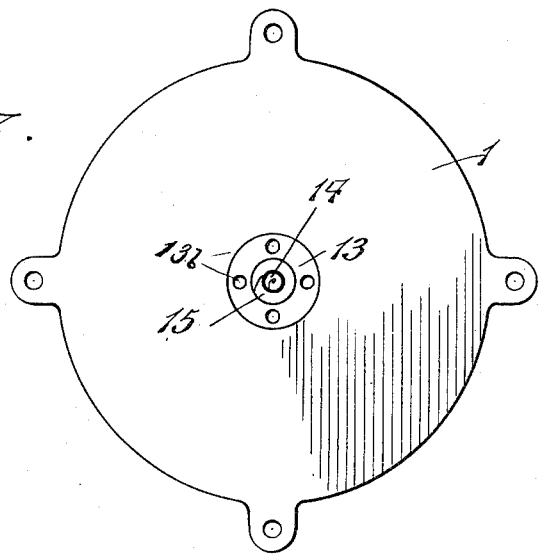

Figure 1 is a longitudinal sectional view of one form of the device in which a centrifugal governor is employed to control the connection of the mechanism whereby the fluid or fuel supply to the motor is regulated; Fig. 2 represents a sectional view taken on the line Y—Y in Fig. 1, looking toward the right in that figure, or in the direction of the arrows, and showing in an enlarged view and in elevation the movable collar constituting a part of the normally disconnected operating means for closing the fluid or fuel supply valve; Fig. 3 shows a sectional view taken on the line Y—Y in Fig. 1 and looking toward the right in that figure, or in the direction of the arrows, and showing in front elevation an enlarged detail of the adjustable connector for controlling the time of operation of the normally disconnected valve-operating means; Fig. 4 is a fragmentary detail of the inner face of the cylinder head, which constitutes one wall of the valve chamber, and illustrating the construction of the valve seat of the supply valve. Fig. 5 is a sectional view taken on the line X—X in Fig. 1; Fig. 6 is a detail plan view showing the means for effectually locking up all of the operative parts of the device; Fig. 7 is an end elevation of the right-hand end of Fig. 1 with the flexible shaft omitted.

Similar reference characters will be employed throughout the specification and drawings to designate corresponding parts.

In the drawings 1 represents a casing designed to inclose and contain the operating parts, and which, as illustrated may comprise a hollow metallic cylinder, having at one end an integral head and which if desired may be provided with a radial flange, and screw or bolt holes, whereby the cylinder may be rigidly attached to a support adjacent to the source of fluid or fuel supply which is to be employed. The cylinder 1 is open at its opposite end, and upon its inner wall is provided with an arch or support 1, cast integral therewith, and nearer the open end than the closed end, and which at its upper end carries part of a bearing for an operating shaft, the other part of the bearing being formed by a journal box 3 which is secured to the support 2 by means of bolts 4 or in any other suitable or convenient manner.

A hollow shaft 5 is mounted in the bearing carried by the support 2, and is preferably provided with circular thrust bearings 6 and 7, whereby the said shaft 5 is prevented from longitudinal displacement. At its opposite end the shaft 5 is mounted in and supported by a threaded journal bearing 13, adjustably fitted in the head of the cylinder 1. As shown in Fig. 7 of the drawing, the bearing 13 is provided with a plurality of holes or sockets 13$^b$, which may be engaged by a spanner wrench or other instrument, whereby the bearing 13 may be turned and its position adjusted relative to the longitudinal direction of the shaft 5. The shaft 5 is intended to be freely rotated in its bearings by means of a flexible shaft 14, which is connected to the shaft 5 by a pin 13$^a$.

In the apparatus of the drawings, the speed is controlled by controlling the admission of fluid or fuel to the engine and particularly the admission of gasolene to gas engines. To this end the apparatus is provided with a valve chamber which is entirely closed except for the presence of inlet and outlet ports, and as shown in the drawings, this valve chamber comprises a convex head 24 and a movable flexible diaphragm 23, the said diaphragm being of a diameter corresponding to the internal diameter of the head 24 and held in place over the open end of the cylinder 1 by means of the head 24 which latter is secured to the cylinder 1 by any suitable form of gas-tight union 36.

The flexible diaphragm 23 forms a movable wall for the valve chamber and is capable of having a limited flexing movement at its center toward and from the inner concave surface of the head 24. The head 24 is provided at its center with an inlet 29 which by means of a suitable gas-tight coupling 25 is connected to a pipe 30 leading to a suitable source of fuel supply and the head 24 is also provided with an outlet 28 which by means of a gas-tight coupling 26 is coupled to a pipe 31 leading to the carbureter of the engine. Upon its inner concave face the head 24 is provided with a valve seat surrounding the inlet port or opening 29, which valve seat as shown has the form of a tapering countersunk recess surrounding the port 29. Coöperating with the valve seat is a valve 22 having a tapered end arranged to fit the tapered seat, and this valve is normally held out of contact with the valve seat and is arranged to be moved in contact therewith to close the inlet port by imparting a flexing movement to the diaphragm constituting the movable wall of the valve chamber. To this end the valve 22 is mounted upon the flexible diaphragm 23 in line with the valve seat in the head 24. As shown in Fig. 4 of the drawing, the valve seat in the head is provided with radial grooves 27 so that even though the valve be seated, a small supply of fluid or fuel will be permitted to enter the valve chamber and to be drawn therefrom through the outlet 28, so that the ending may run idle when the manual control is operated to supply fluid or gas, or when the vehicle is not running.

It is intended that the flexible diaphragm shall be pressed toward the head 24 automatically whenever the vehicle attains a speed in excess of a predetermined maximum speed, and this is accomplished through the hollow shaft 5 which is rotated from the vehicle by means of the flexible shafts 14—15, and preferably by means of some suitable form of governor such as the centrifugal governor shown, consisting of the bells or weights 9 connected to springs 8, one set of which are pivotally connected at one end to the fixed collar 7 of the hollow shaft 5, and the other set being pivotally connected to a movable collar or block 10 mounted to have a sliding movement along the hollow shaft 5. Within the hollow shaft 5 is fitted a rod 16 which has a threaded connection at one end with an adjusting device 17 and a rod 20 secured by means of a block 21 to the flexible diaphragm 23, which rod 20 also has a threaded connection with the adjusting device 17. The threaded connections of the rods 16 and 20 with the adjusting device 17 is of such a character that the rotation of the adjusting device causes the rods 16 and 20 to approach or recede from each other, thus positioning the end of the rod 16 farther away from or closer to the operating collar to be described. The adjusting device 17 is locked after the desired adjustment has been secured by means of a spring finger 19 attached to a part of the bearing 2, the free end of which may take into any one of a series of notches 18 formed in a collar constituting a part of the adjusting device 17. The right-hand end of the rod 16 intersects a slot 12 formed in the hollow shaft 5, and in which slot is arranged a cross-bar 11 connected to the collar 10, the arrangement being such that a movement of the collar 10 along the shaft 5 causes a corresponding movement of the cross-bar 11 along the slot 12 and dependent upon the adjustment of the rods 16 and 20, the end of the rod 16 will be engaged by the cross-bar 11 sooner or later as the collar 10 is moved along the shaft 5.

The arrangement is such that the rotation of the shaft 5 causes a rotary movement to be imparted to the members of the centrifugal governor, and as the balls 9 move farther away from their axis of rotation, they will through the instrumentality of the springs 8 cause the collar 10 and the cross bar 11 to travel along the hollow shaft, and in the event that the maximum speed limit of the vehicle is exceeded, the cross bar 11 will exert pressure upon the end of the rod 16, thus deflecting the diaphragm 23 at its center and causing the valve 22 to approach the valve seat of the inlet valve 29. It will be noted that the adjusting device 17 and the spring finger 19 are so constructed that said adjusting device may have a limited movement in the direction of the axis of the shaft 5 without becoming disconnected from the detent 19.

It will be noted that the essential characteristics of the present invention are that the controlling valve is inclosed in a substantially sealed chamber, and that the valve therein contained is operated by a movable wall of said chamber, without the necessity of providing movable elements projecting through the wall into said chamber, so that the valve is not only protected, but the fluid or fuel on its passage through the chamber cannot escape except through the outlet 28 and thus cannot fill adjacent parts. It is to be further noted that by forming the movable wall of a flexible diaphragm, the resistance to the movement of the diaphragm and the closing of the valve gradually and progressively increases proportionately to the increase of the excessive speed of the vehicle beyond a predetermined maximum speed, owing to the fact that the resistance to deflection of the flexible diaphragm progressively increases as the deflection occurs.

It is to be observed that the construction shown and described whereby the valve is located in a closed valve chamber and practically sealed therein, the operating mechanism inclosed in the cylinder 1 may be immersed in oil without liability to gaseous fluids coming in contact therewith. The chamber 1 is provided with an opening in its wall adapted to be closed by a segmental plate 32, which at one end has a tongue and groove connection with the wall, and at its opposite end is provided with a hasp or bail arranged to engage a staple 33, the latter receiving a suitable lock 34.

In the operation of the apparatus, it is to be understood that so long as the vehicle is running at a speed less than the predetermined maximum speed for which the adjustment has been made, the valve is held away from the valve seat, but as soon as the vehicle exceeds the predetermined maximum speed, the increased rotation of the hollow shaft 5 causes the governor balls to move radially farther away from the axis of the shaft, and this movement causes the collar 10 to move along the shaft 5 until the cross bar 11 engages the end of the rod 16 when a further radial movement of the governor balls causes the rod 16 to move the flexible diaphragm toward the head 24 to seat the valve.

It is to be observed that there are no loose and jointed mechanical parts, but that when once the valve begins its closing movement, it will move steadily and with certainty to the closing position, and that as soon as the speed of the vehicle diminishes, the flexible diaphragm returns the parts to their normal position.

I claim:

1. A valve mechanism comprising a valve chamber, a valve inclosed within said chamber, a movable wall for said valve chamber having an operative connection with said valve, and governor controlled operating mechanism for moving said wall.

2. In combination, a casing, a valve chamber at one end of the casing comprising a movable wall, a valve inclosed in said chamber, a governor controlled operating mechanism within said casing and separated from the valve chamber by the movable wall.

3. In combination, a casing, a valve chamber at one end of the casing comprising a flexible diaphragm forming one wall of said chamber, a valve inclosed in said chamber, a governor controlled operating mechanism within said casing and separated from the valve chamber by the flexible diaphragm.

4. A valve mechanism comprising a valve chamber having a movable wall, a valve inclosed within said chamber, connections between said movable wall and the valve, normally disconnected mechanism between said movable wall and a rotating element, and means controlled by the rotating element for connecting said actuating mechanism to operate the movable wall and to close the valve when the speed of the rotating element exceeds a predetermined maximum speed.

5. In combination, a casing, a valve chamber external to the casing and comprising a movable wall, a valve inclosed in said chamber, a governor-controlled operating mechanism within said casing and separated from the valve chamber by the movable wall.

6. In combination, a casing, a valve chamber external to the casing comprising a flexible diaphragm forming one wall of said chamber, a valve inclosed in said chamber, a governor-controlled operating mechanism within said casing and separated from the valve chamber by the flexible diaphragm.

In testimony whereof I have signed my name to this specification in the presence of two subscribing witnesses.

THEODORE DOUGLAS.

Witnesses:
C. J. KINTNER,
M. F. KEATING.